United States Patent
Yasukochi et al.

(10) Patent No.: US 10,108,178 B2
(45) Date of Patent: Oct. 23, 2018

(54) WORKPIECE MACHINING SURFACE DISPLAY METHOD SHOWING DIMPLES TO BE FORMED ON MASHING SURFACE, WORKPIECE MACHINING SURFACE DISPLAY DEVICE SHOWING THE DIMPLES, AND TOOL PATH GENERATION DEVICE HAVING THE DISPLAY

(75) Inventors: Jiro Yasukochi, Tokyo (JP); Tadashi Kasahara, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 699 days.

(21) Appl. No.: 14/389,305

(22) PCT Filed: Mar. 30, 2012

(86) PCT No.: PCT/JP2012/058645
§ 371 (c)(1),
(2), (4) Date: Sep. 29, 2014

(87) PCT Pub. No.: WO2013/145275
PCT Pub. Date: Oct. 3, 2013

(65) Prior Publication Data
US 2015/0066191 A1 Mar. 5, 2015

(51) Int. Cl.
*G06F 19/00* (2018.01)
*G05B 19/4097* (2006.01)
*G05B 19/4069* (2006.01)

(52) U.S. Cl.
CPC ..... *G05B 19/4097* (2013.01); *G05B 19/4069* (2013.01); *G05B 2219/32153* (2013.01);
(Continued)

(58) Field of Classification Search
None
See application file for complete search history.

(56) References Cited

U.S. PATENT DOCUMENTS

| 6,266,572 B1 * | 7/2001 | Yamazaki | G05B 19/4069 |
| | | | 700/159 |
| 7,047,102 B2 * | 5/2006 | Ikeda | G05B 19/40937 |
| | | | 700/172 |
| 2013/0262066 A1 * | 10/2013 | Erdim | G06F 17/5086 |
| | | | 703/7 |

FOREIGN PATENT DOCUMENTS

| JP | 2003-260528 | 9/2003 |
| JP | 3571564 | 7/2004 |

(Continued)

OTHER PUBLICATIONS

International Search Report dated Apr. 24, 2012, directed to International Application No. PCT/JP2012/058645; 2 pages.
(Continued)

*Primary Examiner* — Wissam Rashid
(74) *Attorney, Agent, or Firm* — Morrison & Foerster LLP

(57) ABSTRACT

The invention is a workpiece machining surface display method by means of which a machining mark generated when a workpiece machining surface is machined by a rotary tool comprising a cutting edge is displayed on a display device. Said workpiece machining surface display method contains: a first step in which the shape and position of an indentation generated by the cutting edge shaving the workpiece machining surface are predicted; and a second step in which an indentation image representing the shape of the indentation that has been predicted in the first step is displayed in association with the predicted position.

7 Claims, 11 Drawing Sheets

(52) U.S. Cl.
CPC ......... *G05B 2219/35117* (2013.01); *G05B 2219/35135* (2013.01); *G05B 2219/35187* (2013.01); *G05B 2219/45145* (2013.01)

(56) References Cited

FOREIGN PATENT DOCUMENTS

| JP | 2008-844 | 1/2008 |
|---|---|---|
| JP | 2010-237843 | 10/2010 |
| JP | 2011-85978 | 4/2011 |
| JP | 2012-18472 | 1/2012 |
| KR | 10-2005-0031044 | 4/2005 |
| WO | WO-2011/125129 | 10/2011 |

OTHER PUBLICATIONS

Matsumura, T. et al. "Machining of Micro Dimples in Milling for Functional Surfaces," *The 14International ESAFORM Conference on Material Forming*, 2011; pp. 567-572.

Bassir, D. et al. (Feb. 2008). "A New Algorithm for the Numerical Simulation of Machined Surface Topography in Multiaxis Ball-End Milling," *Journal of Manufacturing Science and Engineering* 130: 23 pages.

\* cited by examiner

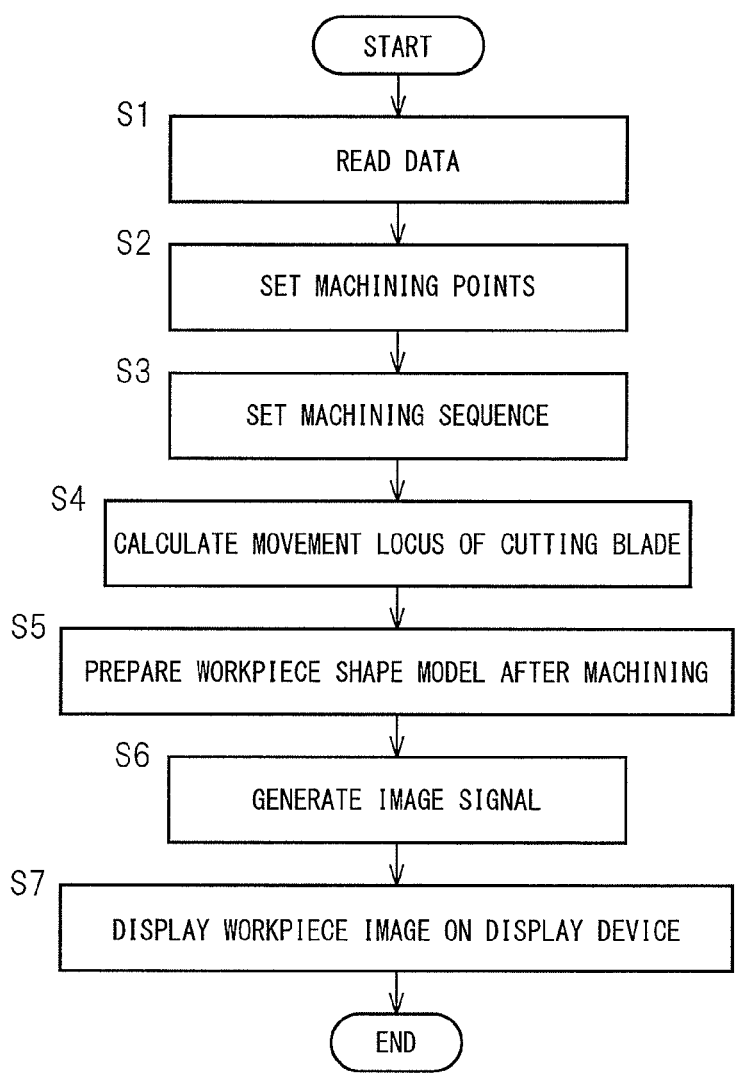

WORKPIECE MACHINING SURFACE DISPLAY METHOD SHOWING DIMPLES TO BE FORMED ON MASHING SURFACE, WORKPIECE MACHINING SURFACE DISPLAY DEVICE SHOWING THE DIMPLES, AND TOOL PATH GENERATION DEVICE HAVING THE DISPLAY

CROSS REFERENCE TO RELATED APPLICATIONS

This application is a U.S. National Phase patent application of PCT/JP2012/058645, filed on Mar. 30, 2012, which is hereby incorporated by reference in the present disclosure in its entirety.

FIELD OF THE INVENTION

The present invention relates to a workpiece machined surface display method, a workpiece machined surface display device, a tool path generating system, and a workpiece machined surface display program which display a machining mark to be formed on a workpiece machined surface.

BACKGROUND OF THE INVENTION

In the past, there has been known a system which is designed to display an image of the workpiece surface which is cut by a ball end mill together with the tool path at the time of cutting (for example, see Patent Literature 1). Further, there has been known a system which is designed to subtract a model of the shape of the sweep of the ball end mill from a 3D model which represents the workpiece shape to display the workpiece machined shape (for example, see Patent Literature 2).

In this regard, if using a ball end mill or other rotary tool to cut the workpiece surface, the workpiece surface is intermittently cut by the cutting blade. For this purpose, the machined workpiece surface is formed with a large number of spherically shaped dimples along the tool path. However, the systems according to Patent Literatures 1 and 2 only display machining marks formed on the workpiece machined surface as groove shapes along the tool paths, and do not display images which correspond to the actual machining marks (dimples) of the workpiece machined surface. Therefore, a user has found it difficult to obtain a grasp of the surface pattern after machining of the workpiece in advance.

PATENT LITERATURE

Patent Literature 1: Japanese Patent Publication No. 2003-260528A
Patent Literature 2: Japanese Patent No. 3571564B

SUMMARY OF THE INVENTION

The present invention provides a workpiece machined surface display method for displaying on a display device a machining mark to be formed when machining a workpiece machined surface with a rotary tool having a cutting blade, including a first step of predicting a shape and position of a dimple to be formed by cutting the workpiece machined surface with the cutting blade, and a second step of displaying a dimple image representing the shape of the dimple predicted at the first step in correspondence with the position predicted at the first step.

Further, the present invention provides a workpiece machined surface display device displaying a machining mark to be formed when machining a workpiece machined surface with a rotary tool having a cutting blade, including a display device, a dimple specifying part specifying a shape and position of a dimple to be formed by cutting the workpiece machined surface with the cutting blade before machining of the workpiece, and a display control part controlling the display device so as to display a dimple image representing the shape of the dimple specified by the dimple specifying part at the position specified by the dimple specifying part.

Further, the present invention provides a tool path generating system generating a tool path for machining a workpiece surface with a rotary tool having a cutting blade, including a display device, a dimple specifying part specifying a shape and position of a dimple to be formed by cutting the workpiece surface with the cutting blade before machining of the workpiece, a display control part controlling the display device so as to display a dimple image representing the shape of the dimple specified by the dimple specifying part at the position specified by the dimple specifying part, and a path generating part generating a tool path of the rotary tool based on the shape and position of the dimple specified by the dimple specifying part.

Still further, the present invention provides a workpiece machined surface display program for making a computer run processing for displaying on a display device a machining mark to be formed when machining a workpiece machined surface with a rotary tool having a cutting blade, including a first routine specifying a shape and position of a dimple to be formed by cutting the workpiece machined surface with the cutting blade before machining of the workpiece, and a second routine controlling the display device so as to display a dimple image representing the shape of the dimple specified by the first routine at the positions specified by the first routine.

BRIEF DESCRIPTION OF THE DRAWINGS

FIG. 11 is a flow chart which shows one example of the processing which is run at the control device of FIG. 1.

DETAILED DESCRIPTION OF THE INVENTION

First Embodiment

Figure 1:
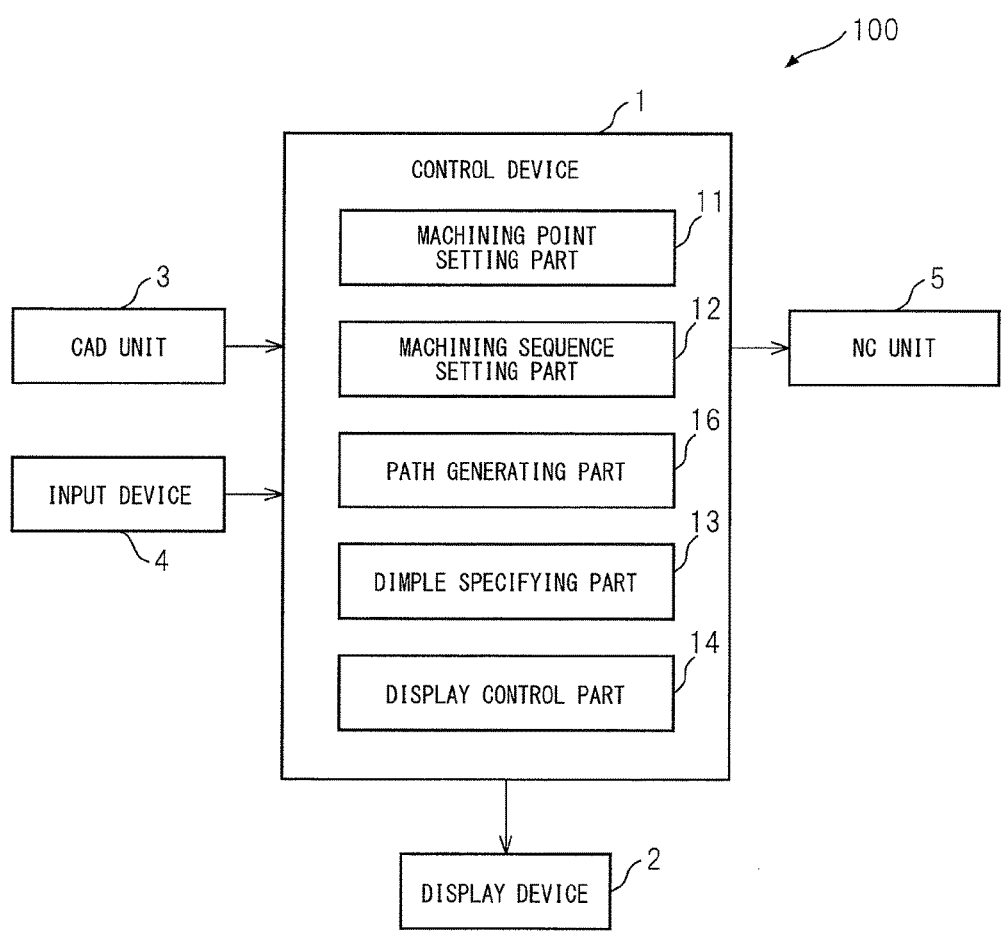
FIG. 1 is a view which shows the general configuration of a workpiece machined surface display device according to a first embodiment of the present invention.

Below, referring to FIG. 1 to FIG. 11, a first embodiment of a workpiece machined surface display device according to the present invention will be explained. FIG. 1 is a view which shows the general configuration of a workpiece machined surface display device 100 according to a first embodiment of the present invention. This workpiece machined surface display device 100 has a display device 2 and a control device 1 which controls the display device 2. The display device 2 is a monitor which displays the image of machining marks which will be formed on the workpiece machined surface.

The control device 1 is a computer which is comprised including a processing system which has a CPU, ROM, RAM, and other peripheral circuits, etc. Functionally, as shown in FIG. 1, it has a machining point setting part 11, machining sequence setting part 12, path generating part 16, dimple specifying part 13, and display control part 14. A CAD unit (computer aided design unit) 3 and an input device 4 are connected to the control device 1. The control device 1 receives as input 3D shape data corresponding to the machined shape of the workpiece from the CAD unit 3 and receives as input various types of data relating to image display from the input device 4. The display control part 14 generates an image signal which it outputs to the display device 2.

Figure 2:
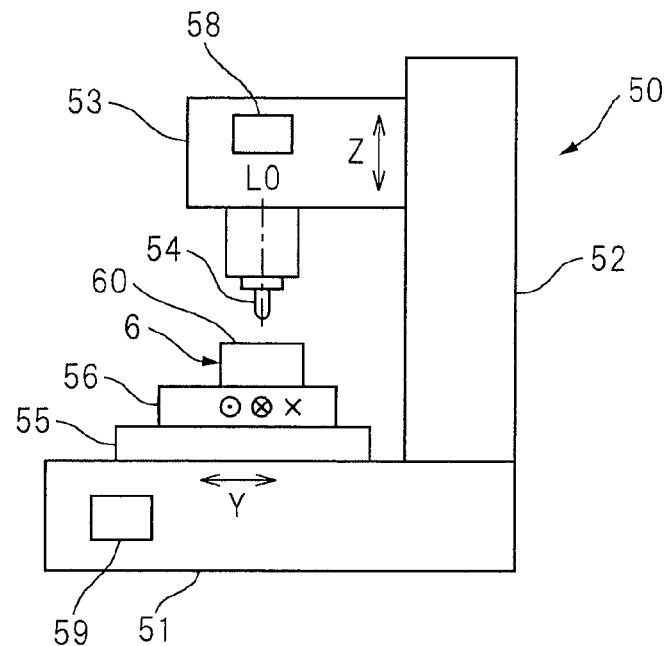
FIG. 2 is a front view which shows one example of a machine tool to which the workpiece machined surface display device of FIG. 1 is applied.

The control device 1 has the function of using the path generating part 16 to generate a tool path of a rotary tool and preparing a machining program for machining the workpiece surface. The machining program which is prepared by the control device 1 is output to an NC unit (numerical control unit) 5. The NC unit 5 uses this machining program as the basis to control the machine tool so that the machine tool machines the workpiece surface. FIG. 2 is a front view which shows one example of a machine tool 50 to which the workpiece machined surface display device 100 according to the present embodiment is applied. In FIG. 2, a vertical machining center is shown.

As shown in FIG. 2, a bed 51 is provided with a column 52 standing on it. At the column 52, a spindle head 53 is supported movably in the up-down direction (Z-axial direction) through a linear feed mechanism. The spindle head 53 has a tool 54 attached to it facing downward through a spindle. The tool 54 is a rotary tool which has a cutting blade which intermittently cuts a surface 60 of a workpiece 6 and is, for example, comprised of a ball end mill. The tool 54 is driven by a spindle motor 58 in the spindle head 53 to rotate about an axial line L0 parallel to the Z-axis.

On the bed 51, a saddle 55 is supported movably in the horizontal direction (Y-axial direction) through a linear feed mechanism. On the saddle 55, a table 56 is supported movably in a horizontal direction (X-axial direction) which is perpendicular to the Y-axial direction. The X-axis use, Y-axis use, and Z-axis use linear feed mechanisms are, for example, comprised of ball screws and servo motors 59 which drive to rotate the ball screws. Due to this configuration, the tool 54 and the workpiece 6 move relatively in three perpendicular directions (X-, Y-, and Z-directions) whereby the workpiece 6 is machined.

The X-axis use, Y-axis use, and Z-axis use servo motors 59 are actually arranged at different positions from each other, but in FIG. 2, these are shown for convenience together as a single servo motor 59. The machine tool 50 may further have an A-axial, B-axial, and C-axial rotational feed shafts. The workpiece 6 is, for example, a shaping die for which precision surface finishing is demanded. As the machine tool 50 to which the workpiece machined surface display device 100 according to the present embodiment is applied, for example, there are a horizontal machining center or five-axis machining center, a machine tool other than a machining center, and other various machine tools.

Figure 3:
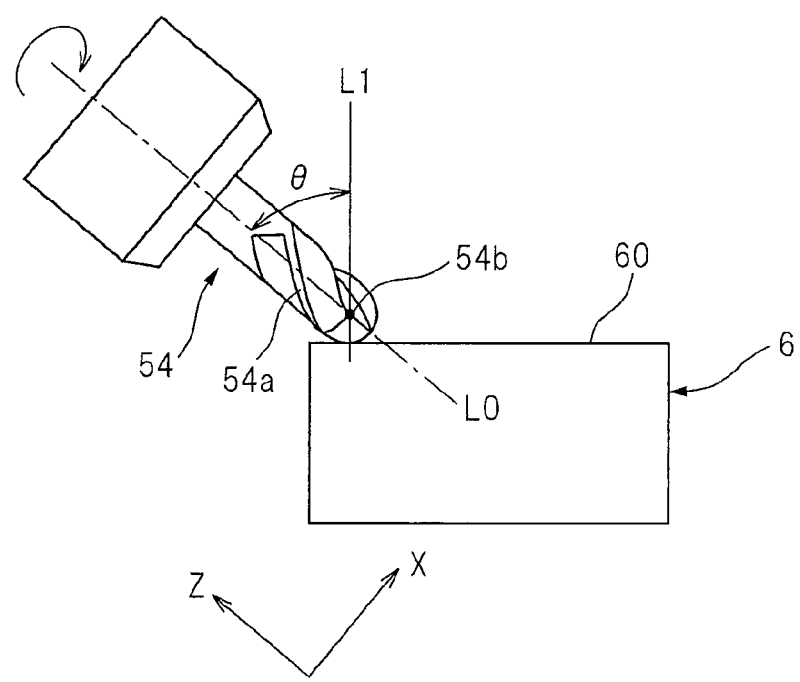
FIG. 3 is an enlarged view of a tool which shows a machined state of a workpiece surface which is used for the machine tool of FIG. 2.

FIG. 3 is an enlarged view of a tool 54 which shows a machined state of a workpiece surface 60. In FIG. 3, the B-axis is tilted to make the axial line L0 of the tool 54 tilt relative to the workpiece surface 60, and the angle formed by the axial line L0 and the vertical line L1 of the workpiece surface 60 is made a predetermined angle θ larger than 0° (for example, 45°). As shown in FIG. 3, the tool 54 which is used in the present embodiment is a ball end mill which has a predetermined number of spiral shaped cutting blades 54a at its circumference and has a front end part which exhibits an arc shape. Below, for simplification of the explanation, the tool 54 is assumed to be a single blade ball end mill which has a single cutting blade 54a. The shape of the front end of the tool (radius of ball, etc.), which is based on the center 54b of the ball of the front end part of the tool, is known in advance. The position of the tool 54 can be specified by the coordinates of the center 54b.

If making the tool 54 rotate and making it move relative to the workpiece 6 to machine the workpiece surface 60, the workpiece surface 60 is intermittently cut by the cutting blade 54a whereby uncut parts called "cusps 62" (see FIG. 4B) are formed at the workpiece surface 60.

Figure 4A:
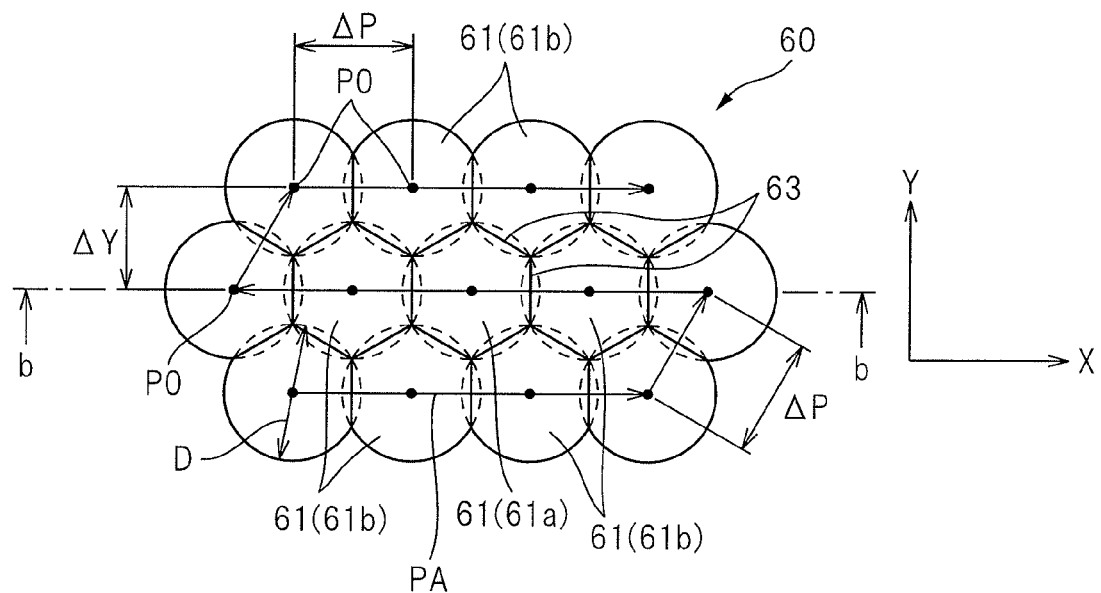
FIG. 4A is a plan view which shows one example of the shape of a workpiece surface after being cut.
Figure 4B:
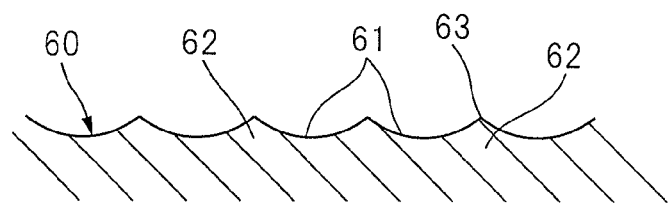
FIG. 4B is a cross-sectional view cut along a line b-b of FIG. 4A.

FIG. 4A is a plan view which shows one example of the shape of the workpiece surface after cutting, while FIG. 4B is a cross-sectional view cut along the line b-b of FIG. 4A. In FIG. 4A, the workpiece surface 60 is shown by an XY plane. For example, by making the tool 54 relatively move on the XY plane along the machining points P0 as shown by the arrows PA, the shape of the workpiece surface of FIG. 4A is obtained. The respective machining points P0 are points which express target positions of the centers 54b which are reference points of the tool 54 when machining the workpiece, i.e., machining command points for generating a tool path. The arrows PA correspond to the tool path. The machining program also includes position data of the machining points P0 which are sequenced along the tool path PA and data of the amount of tool rotation.

The distance ΔP between the machining points P0, P0 along the arrows PA corresponds to, for example, the amount of one blade of feed, and thus the tool 54 rotates by one blade's worth of angle between the machining points. A distance ΔY between the machining points P0, P0 in the Y-axial direction corresponds to an amount of pick feed. In the present embodiment, a single blade ball end mill is used, so the tool 54 rotates once from one machining point P0 to the next machining point P0. By making the tool 54 rotate while making it move relatively along the tool path PA, the workpiece surface 60 is cut by the cutting blade 54a whereby the workpiece surface 60 is formed with a plurality of spherical surface shaped dimples 61 corresponding to the tool shape.

The amount of feed ΔP of FIG. 4A is smaller than the diameter D of the dimples 61. The dimples 61 partially overlap. As a result, as shown in FIG. 4B, between one adjoining dimple 61 and another dimple 61, a convex shape uncut part, i.e., a cusp 62, is formed. In FIG. 4A, if expressing one dimple 61 and its surrounding dimples 61 by respectively 61a and 61b, six dimples 61b are evenly formed around one dimple 61a so as to overlap partially with the dimple 61a. At the boundary parts of the dimple 61a and the dimples 61b, straight intersection lines 63 are formed. Therefore, the shapes of the machined dimples become hexagonal shapes (solid lines) in the plan view surrounded by six intersection lines 63.

Figure 5:
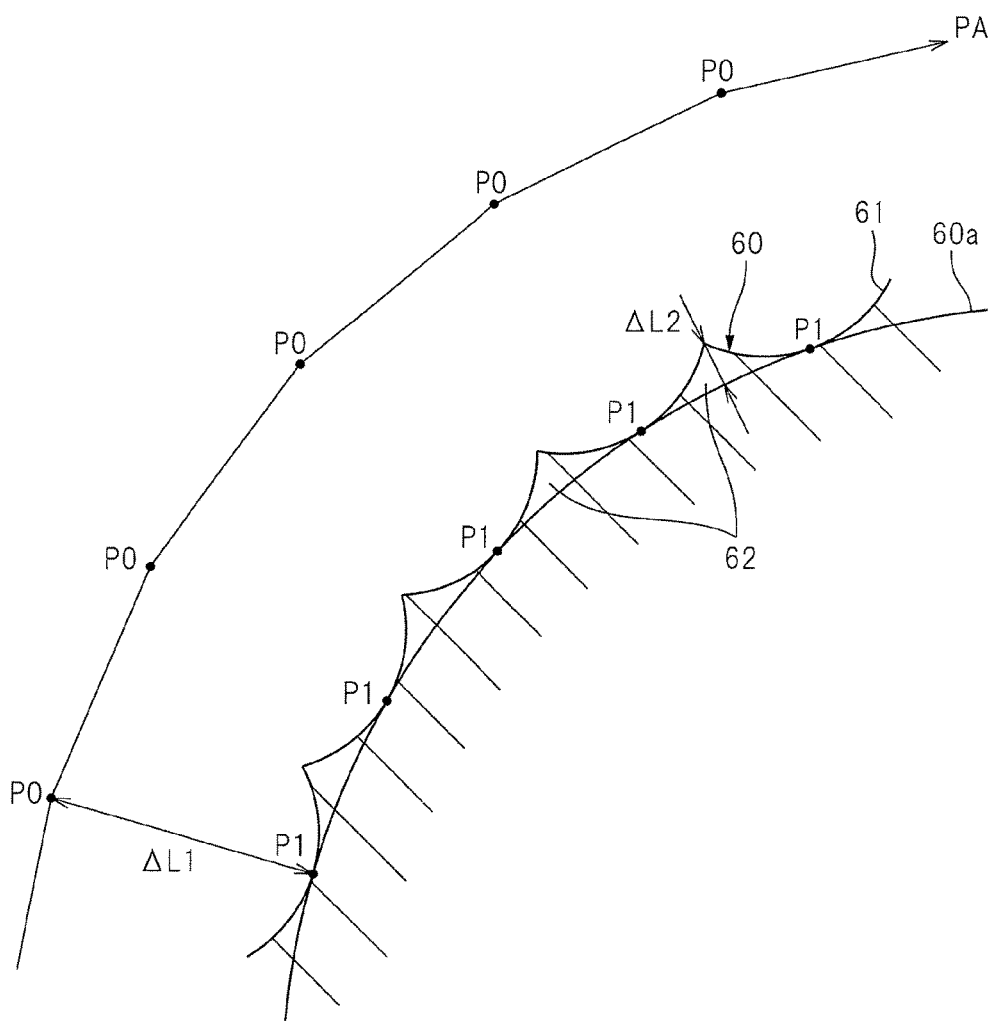
FIG. 5 is a view which shows the positional relationship between dimples which are formed at a workpiece surface and machining points.

FIG. 5 is a view which shows the positional relationship between the dimples 61 which are formed at the workpiece surface 60 and the machining points P0. In FIG. 5, the center point of a spherical shaped dimple 61 (median point of adjoining cusps 62, 62) is designated as P1, while the design-stage workpiece surface ignoring the formation of the cusps 62 is designated as 60a. As shown in FIG. 5, the center points P1 of the dimples 61 are positioned on the workpiece surface 60a, while the machining points P0 are set at positions predetermined distances ΔL1 from the center points P1. Therefore, the tool path PA which connects the machining points P0 is formed separated from the workpiece surface 60a by the predetermined distance ΔL1. ΔL1 corresponds to the distance from the center 54b of the tool 54 of FIG. 3 to the outer circumferential surface of the cutting blade 54a of the front end part of the tool, i.e., the radius of the ball at the front end part of the tool. The maximum distance between the design-stage workpiece surface 60a and the actual workpiece surface 60 corresponds to the cusp height ΔL2.

As shown in FIG. 4A, if setting the machining points P0 uniformly above the workpiece surface 60 (strictly speaking, the design-stage workpiece surface 60a) to generate the tool path PA and making the tool 54 rotate by one blade's worth of angle between the machining points, it is possible to uniformly arrange a plurality of dimples 61 at the workpiece surface 60. However, when a machining area includes a plurality of mutually adjoining machining areas (first machining area and second machining area), the tool path is formed independently at each machining area, so incompletely shaped dimples are liable to be formed at the boundary part of the first machining area and the second machining area. This problem will be explained with reference to FIG. 6.

Figure 6:
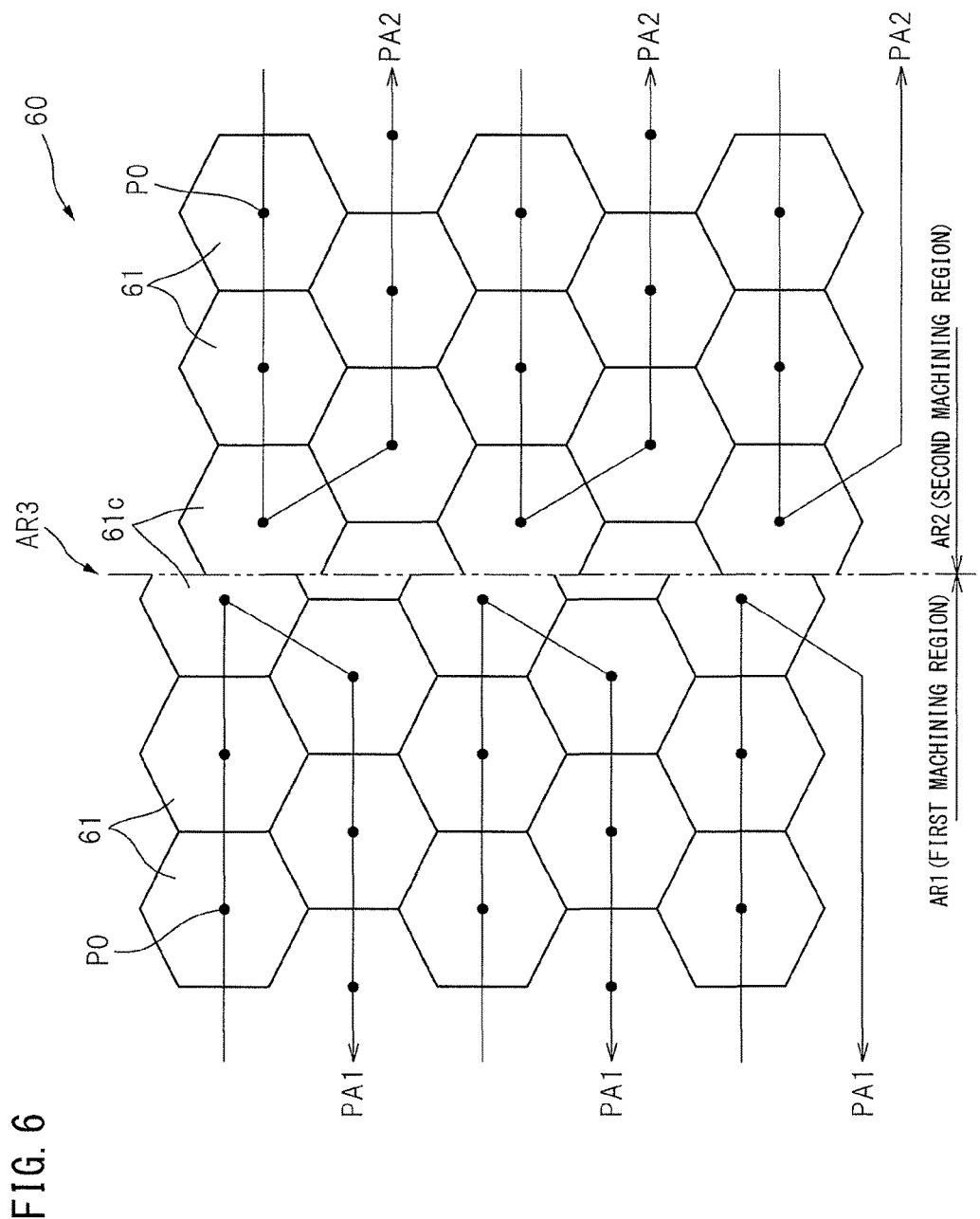
FIG. 6 is a plan view of a workpiece surface which includes a first machining area and a second machining area and a view which explains problems in conventional machining.

FIG. 6 is a plan view of a workpiece surface W1 which includes a first machining area AR1 and a second machining area AR2. The "machining area" is an area which is machined along a predetermined tool path, i.e., an area with a constant machining pattern. More specifically, the tool path PA is set for each machining area. The tool paths at the different machining areas are discontinuous. As shown in FIG. 6, in the first machining area AR1 and second machining area AR2, pluralities of machining points P0 are set evenly, like in FIG. 4A.

assuming that the first machining area AR1 is machined along the tool path PA1, then the second machining area is machined along the tool path PA2 which is independent from the tool path PA1. In this case, the positions of the dimples 61 of the first machining area AR1 have no relation with the positions of the dimples 61 of the second machining area AR2. For this reason, at the boundary part AR3 of the first machining area AR1 and the second machining area AR2, incompletely shaped dimples 61c are formed. Due to these incompletely shaped dimples 61c, streak patterns and other machining marks are liable to be left at the workpiece machined surface.

Such machining marks are not preferable for a workpiece 6 where machining quality of the surface is demanded (for example, a die). If the user can obtain a grasp of the machining marks which would be formed at the workpiece surface 60 in advance before machining the workpiece, it would be possible to reset the tool path and other machining conditions so as to avoid the formation of streak patterns such as shown in FIG. 6. Therefore, in the present embodiment, the shapes and positions of the dimples 61 which are formed at the workpiece surface 60 are predicted and the results of prediction are displayed at the display device 2. In order to realize this, the control device 1 is configured as follows.

The machining point setting part 11 of FIG. 1 divides a shape model which expresses the shape of the workpiece surface into a plurality of meshes and sets machining points P0 in accordance with the meshes. The conditions for preparing the mesh are input in advance from the input device 4 and stored in the memory. The machining point setting part 11 reads the mesh preparation conditions and reads the shape data of the design-stage workpiece surface 60a from the CAD unit 3. Further, these input data are used as the basis to automatically prepare a mesh along the shape of the workpiece surface and set the machining points P0.

The input device 4 is configured by a keyboard, touch panel, etc. The shape and dimensions of the meshes can be input as the mesh preparation conditions by a user. From the input device 4, the type of the tool 54, number of cutting blades 54a, dimensions of the front end part of the tool (radius of the ball at the tool front end), feed rate of the tool 54, rotational speed, and other information are also input. The various information which is input from the input device 4 is stored in a memory.

Figure 7:
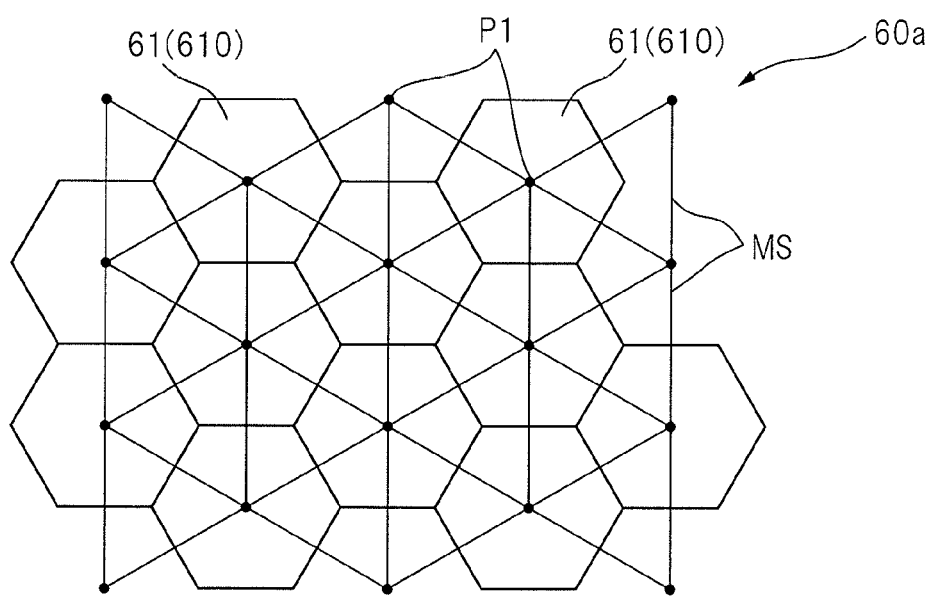
FIG. 7 is a view which shows one example of a mesh which is prepared by a machining point setting part of FIG. 1.

There are various methods for automatic preparation of a mesh. Giving one example, Delaunay triangulation is known. FIG. 7 is a view which shows one example of meshes MS prepared by the machining point setting part 11. In this example, Delaunay triangulation is used to prepare meshes MS of equilateral triangles along the workpiece surface 60a. The vertices of the meshes MS correspond to the center points P1 (FIG. 5) of the dimples 610 which are displayed on the display device 2, while the distances between center points P1, P1 correspond to the sizes of the dimples 61. The machining point setting part 11 divides the design-stage workpiece surface 60a into a mesh, then sets the machining points P0 at positions separated from the vertices P1 of the meshes MS by a predetermined distance ΔL1 (FIG. 5). The set machining points P0 are stored in the memory.

Below, the dimples which are displayed on the display device 2 will sometimes be called "dimple images 610" to differentiate them from dimples 61 which are formed on the actual workpiece surface 60. As the mesh preparation method in the machining point setting part 11, the start point of preparation of the mesh may be given in advance by a user and the meshes MS may be successively prepared in accordance with a predetermined pattern from this start point. The machining points P0 need not be set automatically. A user can also set them manually through the input device 4. That is, the machining points P0 which are set by the machining point setting part 11 may be set automatically or manually.

The machining sequence setting part 12 successively connects the machining points P0 set by the machining point setting part 11 to set the machining sequence. This machining sequence represents the tool path PA and, for example, as shown by the tool paths PA1 and PA2 of FIG. 6, is automatically set by successively connecting the machining points P0 which are included in the machining areas AR1 and AR2 along one direction from one end part to another end part, then shifting by the amount of pick feed and successively connecting the points in the opposite direction and repeating this. The set machining sequence is stored in the memory. The machining sequence need not be automatically set. It may also be manually set by the user through the input device 4. That is, the machining sequence which is set by the machining sequence setting part 12 may be set either automatically or manually.

The dimple specifying part 13 uses the shape data of the workpiece 6 input from the CAD unit 3, the shape data of the tool 54 input from the input device 4, and the information of the tool path PA stored in the memory (data of machining points P0 and machining sequence) as the basis to specify the shapes and positions of the dimples 61. More specifically, first, the shape data of the cutting blade 54a of the tool 54 (arc shaped curve) is taken out, then a movement locus is determined when making the curve rotate and move in accordance with the information of the tool path PA. The information of the tool path PA includes the posture, rotational speed, feed rate, etc. of the tool 54 and other information as well.

Figure 8A:
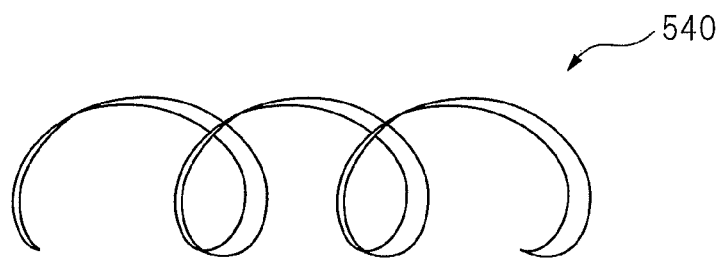
FIG. 8A is a view which shows one example of a movement locus of a cutting blade.
Figure 8B:
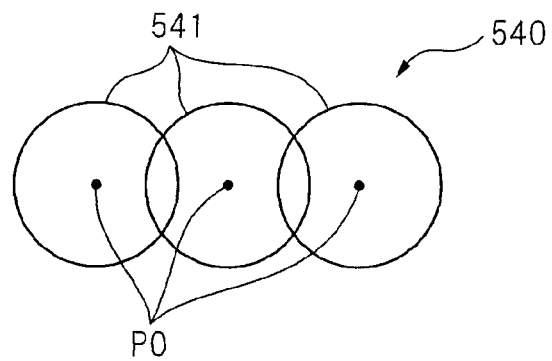
FIG. 8B is a view which shows a modification of FIG. 8A.

FIG. 8A is a view which shows one example of a movement locus 540 of a cutting blade 54a. In FIG. 8A, the movement locus 540 proceeds along the tool path PA in a spiral shape. On the other hand, in normal cutting, the rotational speed of the tool 54 is sufficiently fast compared with the feed speed. By the tool 54 turning one blade's worth of angle each machining point P0, as shown in FIG. 4A, a spherical shaped dimple 61 is formed at the workpiece surface 60 after machining. Therefore, as shown in FIG. 8B, spheres 541 of a predetermined radius centered on the machining points P0 (tool centers 54b) are arranged in a string along the tool path PA whereby it is possible to approximate the movement locus 540.

Figure 9A:
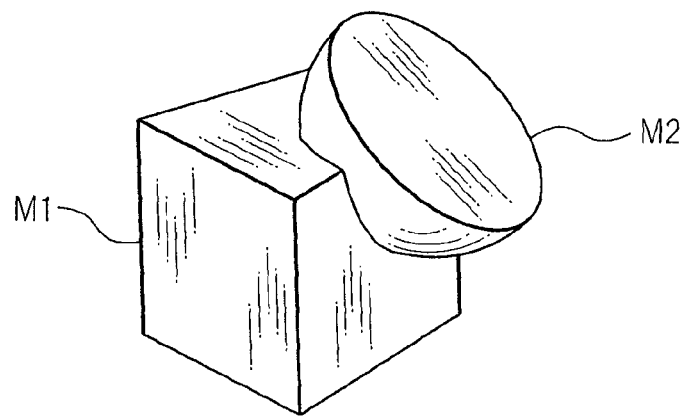
FIG. 9A is a view which explains processing at a dimple specifying part of FIG. 1.
Figure 9B:
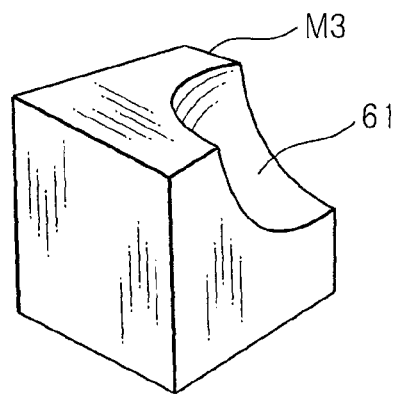
FIG. 9B is a further view which explains processing at a dimple specifying part of FIG. 1.

After determining the curve data of the movement locus 540, the dimple specifying part 13 removes the overlapping parts of the movement locus 540 from the workpiece shape model which is obtained by the workpiece shape data read from the CAD unit 3 so as to prepare a workpiece shape model after machining. FIG. 9A and FIG. 9B are views which explain a procedure for preparing a workpiece shape model M3 after machining. For convenience, the workpiece shape model M1 before machining is shown as a cube, while the model M2 of the movement locus 540 of the cutting blade 54a is shown as a half sphere.

As shown in FIG. 9A, part of the shape model M2 of the sphere 541 overlaps the workpiece shape model M1 before machining. The dimple specifying part 13 removes the overlapping parts from the workpiece shape model M1. Due to this, as shown in FIG. 9B, it is possible to obtain a workpiece shape model M3 after machining comprised of the workpiece shape model M1 plus the dimples 61. The processing for removing the model M2 of the movement locus 540 from the workpiece shape model M1 can, for example, be performed by utilizing Boolean processing. Since Boolean processing is a function which an ordinary 3D CAD unit has, a detailed explanation thereof will be omitted.

The workpiece shape model M3 obtained by the above routine is formed with dimples 61. Due to this, it is possible to specify the shapes and positions of the dimples 61. In this case, as shown in FIG. 8B, if approximating the movement locus 540 by a set of spheres 541 of the same shape, it is possible to define the shapes and positions of the dimples 61 by just the position data of the machining points P0 and shape data of a single type of sphere 541. As a result, the amount of data can be reduced and the workpiece shape model M3 can be acquired in a short time. As opposed to this, when defining a single dimple 61 by position data of several hundred points, the shape and position of the dimple 61 could be more accurately defined, but the volume of data would become enormous and the calculation time would become longer.

The display control part 14 generates an image signal which corresponds to the workpiece shape model M3. Further, it displays on the display device 2 an image of the workpiece machined surface which includes dimple images 610 (workpiece image). For example, polygon patches (triangular patches etc.) or wire frames known as display methods of a usual 3D CAD unit are used to display dimple images 610 three-dimensionally.

Figure 10A:
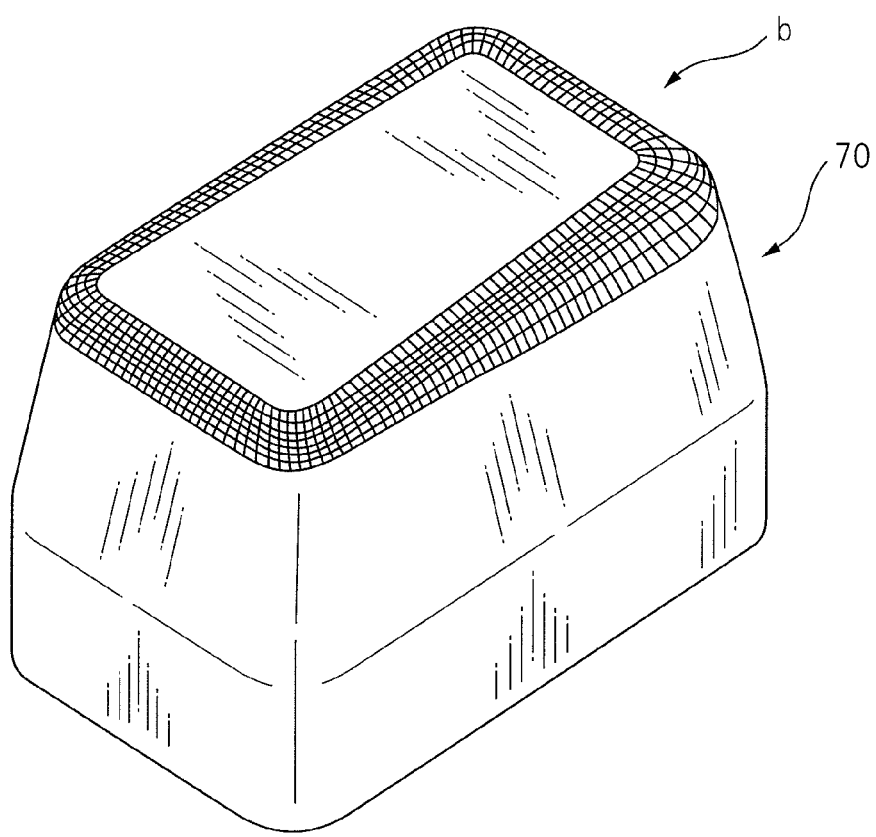
FIG. 10A is a view which shows one example of a workpiece image which is obtained by a workpiece machined surface display device of FIG. 1.
Figure 10B:
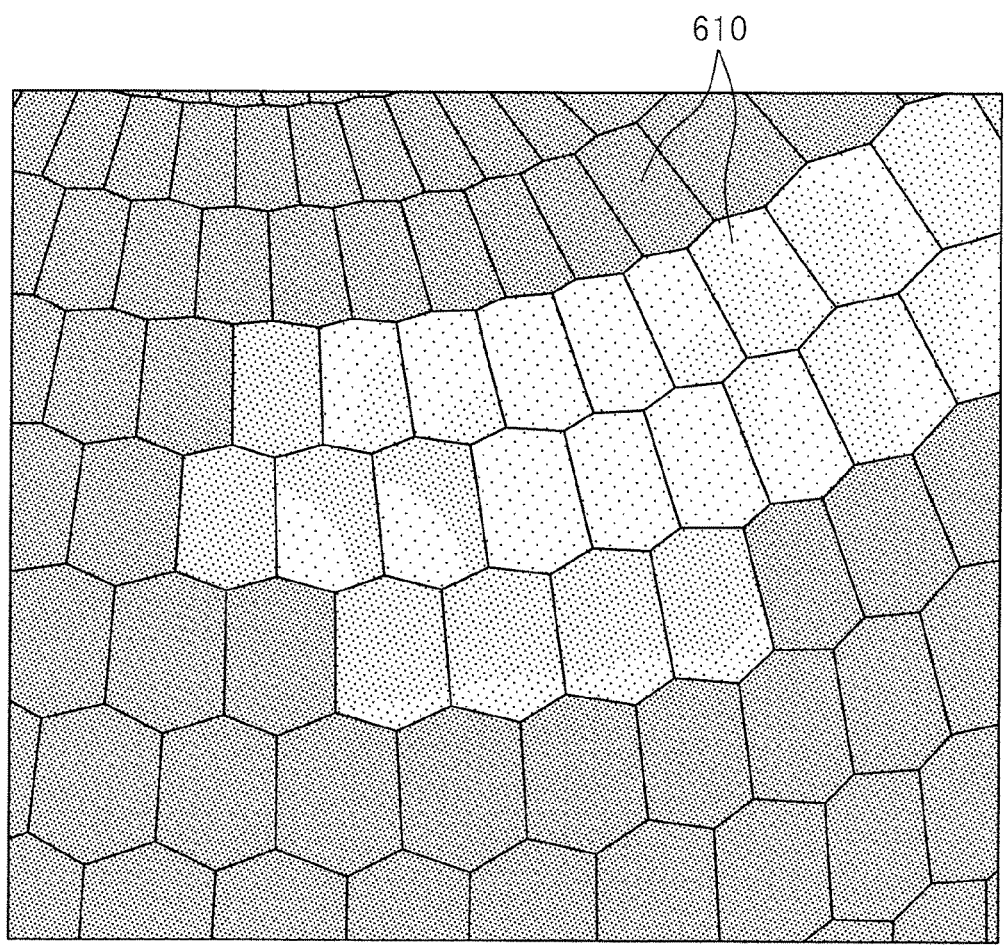
FIG. 10B is an enlarged view of a part "b" of FIG. 10A.

FIG. 10A is a view which shows one example of a workpiece image 7, while FIG. 10B is an enlarged view of a part "b" of FIG. 10A. What position of the workpiece image 70 to enlarge can be suitably selected by the user by operation of the input device 4 (for example, a mouse). The image of FIG. 10A and the image of FIG. 10B may be displayed simultaneously while dividing the monitor screen into a plurality of sections or either may be displayed by the selection of the user. The machining marks of the workpiece image 70 may be displayed only for a required location set in advance by the user or, in FIG. 10A, part of the machining marks of the workpiece surface are displayed.

In FIG. 10B, in order to clearly show the relief shapes at the workpiece surface 60, the dimple images 610 are given shading. For example, when assuming illuminating the workpiece surface 60 by light from a light source, the reflectance ratio of the light of the elements which form the dimple images 610 (for example, triangular patches) is determined and the displayed shadings of the elements are changed in accordance with the reflectance ratio. Due to this, it is possible to clearly display relief shapes of the workpiece surface 60.

The above processing can be realized by making the CPU of the control device 1 run a workpiece machined surface display program stored in advance in the control device 1. FIG. 11 is a flow chart which shows an example of the processing run by the control device 1 (display processing). The processing shown by this flow chart is, for example, started when the user operates the input device 4 to input a command for display of the machined surface.

At step S1, the workpiece shape data is read from the CAD unit 3 and the various data stored in advance (mesh preparation conditions, shape data of the tool 54, posture, rotational speed, feed rate, etc. of the tool 54, and other data) is read.

At step S2, the workpiece surface 60a is divided into a plurality of meshes MS in accordance with the mesh preparation conditions. Further, the vertices of the meshes MS are used as center points P1 of the dimple images 610, and machining points P0 corresponding to these center points P1 are calculated and stored in the memory.

At step S3, the machining points P0 determined at step S2 are successively connected to set a machining sequence. The machining sequence is part of the information of the tool path PA. At step S3, the machining sequence is stored in the memory along with the posture, rotational speed, and feed rate of the tool 54 and other information of the tool path PA stored in advance.

At step S4, the information of the tool path PA and the shape data of the tool 54 stored in advance are used as the basis to calculate the movement locus 540 of the cutting blade 54a. For example, when the set of spheres 541 which are centered about the machining points P0 (FIG. 8B) is the movement locus 540, the shape data of the spheres 541 is calculated.

At step S5, the overlapping portions of the movement locus 540 of the tool 54 calculated at step S4 are removed from the workpiece shape model M1 before machining obtained from the CAD unit 3 to prepare the workpiece shape model M3 after machining (FIG. 9B). That is, the subtraction processing of the Boolean processing is performed to prepare the workpiece shape model M3. This workpiece shape model M3 includes dimples 61, so by calculating the workpiece shape model M3, it is possible to specify the shapes and positions of the dimples 61.

At step S6, the image signal which corresponds to the workpiece shape model M3 prepared at step S5 is generated. For example, when using triangular patches to display the workpiece image 70, elements of the triangular patches are generated. In this case, the extents of shading of the elements are determined in accordance with the relief shapes of the workpiece surface obtained by the workpiece shape model M3.

At step S7, the image signal generated at step S6 is used as the basis to output a control signal to the display device 2, and the display device 2 is made to display a workpiece image 70 which corresponds to the workpiece shape model M3 (FIG. 10A and FIG. 10B). This workpiece image 70 includes dimples (dimple images 610) in the same way as the actual machining marks. For this purpose, the user can easily obtain a grasp of the machining marks which would be formed by machining the workpiece According to the first embodiment, the following actions and effects can be exhibited.
(1) The shape model M2 of the movement locus 540 of the cutting blade 54 is cut from the workpiece shape model M1 obtained from the CAD unit 3 so as to specify the shapes and positions of the dimples 61 which will be formed by the cutting blade 54a cutting the workpiece surface 60. Further, the dimple images 610 which show the shapes of the dimples 61 are made to be displayed at the display device 2 corresponding to the specified positions. Due to this, it becomes possible for the user to obtain a grasp of the surface patterns after machining the workpiece in advance without actually machining the workpiece 6 and possible to set the optimum tool path PA considering machining marks of the workpiece machined surface by the path generating part 16 of the control device 1.
(2) The dimple shapes which are expressed by the dimple images 610 are three-dimensional shapes (for example, spherical shapes) and reflect well the shapes of actual machining marks on the workpiece surface. For this purpose, a user can obtain a correct grasp of the surface patterns after machining the workpiece.
(3) If making the shapes of the dimples on the workpiece image 70 the same shapes as each other (for example, spherical shapes), it is possible to use position data of a single point for each machining point P0 specifying the position of a dimple 61 to generate the dimple images 610 and the amount of data can be reduced.
(4) Boolean processing is used to remove the model M2 of the movement locus 540 of the cutting blade 54a from the workpiece shape model M1 before machining so as to prepare the workpiece shape model M3 after machining. Therefore, it is possible to use a general graphic technique to easily specify the shapes and positions of the dimples 61.
(5) The model M2 of the movement locus of the cutting blade 54a is successively removed from the workpiece shape model M1 in accordance with the tool path PA to prepare the workpiece shape model M3. Therefore, even if the machining points P0 are the same, when the tool paths PA are different, it is possible to precisely display machining marks corresponding to the tool path PA.

Second Embodiment

Figure 12:
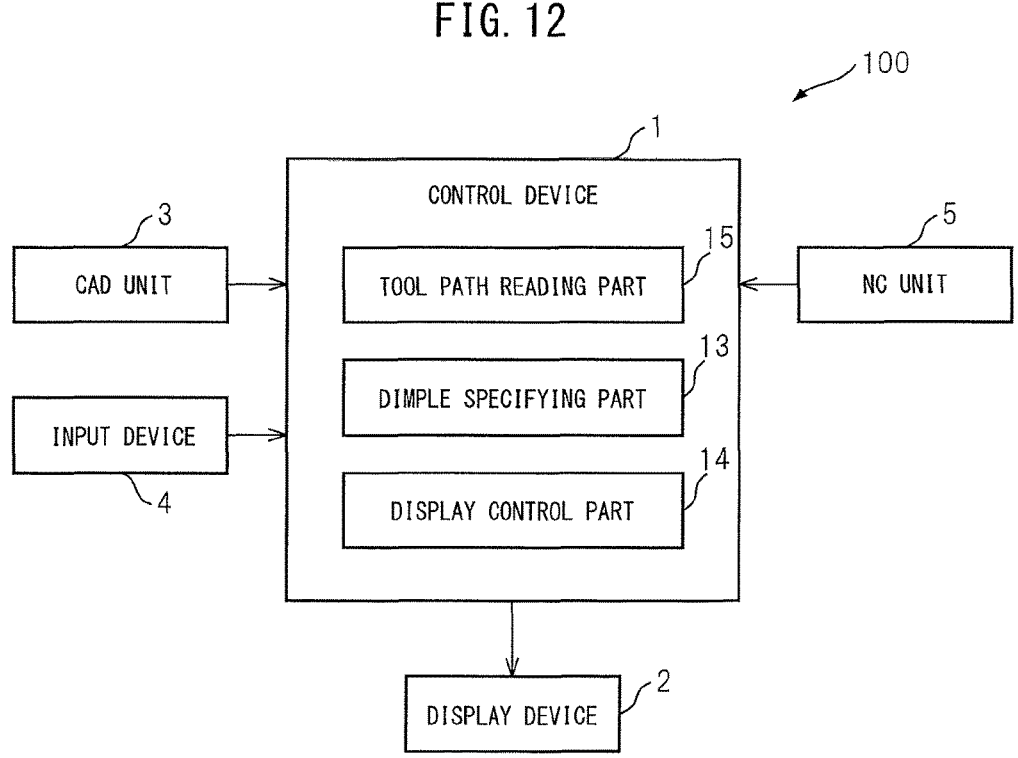
FIG. 12 is a view which shows the general configuration of a workpiece machined surface display device according to a second embodiment of the present invention.

Referring to FIG. 12, a second embodiment of the workpiece machined surface display device according to the present invention will be explained. FIG. 12 is a view which shows the general configuration of a workpiece machined surface display device 100 according to a second embodiment of the present invention. The same locations as in FIG. 1 are assigned the same reference notations. Below, mainly points of difference from the first embodiment will be explained.

In the first embodiment (FIG. 1), the control device 1 is provided with a machining point setting part 11 and a machining sequence setting part 12. The control device 1 generates a machining program which includes the tool path PA and outputs it to the NC unit 5. As opposed to this, in the second embodiment, a not shown tool path generating system is used to generate a tool path in advance. The control device 1 receives information of the tool path PA output from this tool path generating system to the NC unit 5.

Therefore, as shown in FIG. 12, the control device 1 according to the second embodiment is not provided with the machining point setting part 11 and the machining sequence setting part 12. Instead, the tool path reading part 15 is provided. The tool path reading part 15 reads information of the tool path PA from the NC unit 5 and stores it in the memory.

The dimple specifying part 13, in the same way as the first embodiment, uses the shape data of the workpiece 6 input from the CAD unit 3, the shape data of the tool 54 input from the input device 4, and the information of the tool path PA stored in the memory as the basis to prepare a workpiece shape model M3 and specify the shapes and positions of the dimples 61. The display control part 14, like in the first embodiment, generates an image signal which corresponds to the workpiece shape model M3 and makes an image of the workpiece machined surface which includes the dimple images 610 (workpiece image 70 of FIG. 10A and FIG. 10B) display on the display device 2. Due to this, a user can predict in advance the machining marks after machining the workpiece, i.e., the surface patterns, and it becomes possible to judge whether the tool path PA should be corrected. In particular, in the second embodiment, the actual machining use tool path PA is input and the tool path PA is used as the basis to form the workpiece image 70, so the workpiece image 70 corresponds well to the actual machining marks.

In the second embodiment, the tool path PA is read from the NC unit 5. For this purpose, the processing of step S2 and step S3 in FIG. 11 is unnecessary. The rest of the processing is similar to the processing in FIG. 11.

In the above embodiments, as a first step, the shapes and positions of dimples 61 are specified by preparing a workpiece shape model M3 after machining by removing the model M2 of the movement locus 540 of the cutting blade 54a from the workpiece shape model M1 before machining. If specifying the shapes and positions of dimples 61 to be formed by the cutting blade 54a cutting the workpiece machined surface 60 before machining of the workpiece in this way, the dimple specifying part 13 is not limited to the configuration explained above. Further, if predicting the shapes and positions of the dimples 61 to be formed by the cutting blade 54a cutting the workpiece machined surface, the first step of the workpiece machined surface display method may be any step. For example, it is also possible to predict the shapes and positions of the dimples 61 by other than the control device 1 and input the results of the prediction to the control device 1.

In the above embodiments, the second step generates an image signal which corresponds to the shapes and positions of the dimples 61 specified by the workpiece shape model M3 and makes a workpiece image 70 which includes the dimple images 610 display on the display device 2. If controlling the display device 2 so as to display the dimple images 610 which express the shapes of the dimples 61 in this way at the positions specified by the dimple specifying part 13, the display control part 14 is not limited to the configuration explained above. If making the dimple images 610 which express the shapes of the dimples 61 predicted at the first step display corresponding to the predicted positions, the second step of the workpiece machined surface display method may be any step.

If making the computer constituted by the control device 1 run a first routine of specifying the shapes and positions of dimples 61 which are formed by the cutting blade 54a cutting the workpiece machined surface 60 before machining of the workpiece and a second routine of controlling the display device 2 so as to display dimple images 610 which show the shapes of the dimples 61 specified at the first routine at the specified positions, the workpiece machined surface display program is not limited to the above configuration. Therefore, the processing in the control device 1 is not limited to that shown in FIG. 11. The workpiece machined surface display program can be stored in the control device 1 through various storage media and communication lines, etc.

In the above embodiments, a ball end mill is used as the tool 54, but it is also possible to use a bull nose end mill (radius end mill) instead. When using a bull nose end mill, dimples 61 can be approximated not by spherical shapes, but by torus shapes. Therefore, the machining marks of the workpiece surface become, for example, horizontally long hexagonal shapes when seen from a plan view. The shapes of the dimple images 610 may be set according to this. That is, in the above embodiments, the dimple images 610 are approximated by spherical surfaces, but they may also be approximated by ellipsoidal surfaces or other curved surfaces.

The dimples 61 of the workpiece shape model M3 are as one example all made the same shapes of spherical shapes, but it is also possible to set a plurality of shapes of dimples 61 such as spherical shapes and ellipsoidal spherical shapes, etc., and possible to set dimples of any shapes corresponding to the positions of the dimples 61. In order to enable the relief shapes of the workpiece surface 60 to be clearly shown, the dimple images 610 are displayed three-dimensionally by polygonal patches, etc., but they may also be displayed two-dimensionally as simple hexagonal shapes.

Even if using a grindstone or other rotary tool which has a cutting blade as the rotary tool 54, the present invention can be similarly applied.

The tool path generating system provided with the display device 2, dimple specifying part 13, display control part 14, and path generating part 16 is not limited to the above-mentioned configuration. The display device 2 is not limited, as in the present embodiment, to a form which is provided at a workpiece surface machining system 100 or a tool path generating system comprised of a workpiece surface machining system 100 plus a path generating part and may also serve as a display device of an NC unit 5. Further, it may also serve as a display device of a control panel of a machine tool 50.

According to the present invention, before machining of the workpiece, the shapes and positions of dimples which are formed by the cutting blade cutting the workpiece machined surface are predicted, and dimple images which express the shapes of the dimples are displayed corresponding to the predicted positions. Therefore, a user can easily obtain a grasp of surface patterns (machining marks) which will be expressed by dimples after machining of the workpiece.

REFERENCE SIGNS LIST 1 control device
2 display device
3 CAD unit
4 input device
5 NC unit
13 dimple specifying part
14 display control part
16 path generating part
54 tool
54a cutting blade
60 workpiece surface
61 dimple
610 dimple image
100 workpiece machined surface display device

The invention claimed is:

1. A workpiece machined surface display method for displaying on a display device a machining mark to be formed when machining a workpiece machined surface with a rotary tool having a cutting blade, comprising:
   a first step of predicting shapes and positions of dimples to be formed by cutting the workpiece machined surface with the cutting blade when the rotary tool is rotated and fed, by reading shape data of the workpiece and shape data of the tool and calculating a workpiece shape model after machining; and
   a second step of displaying dimple images representing the shapes of the dimples predicted at the first step in correspondence with the positions predicted at the first step,
   wherein in the first step of predicting, calculations are performed to identify cusps that have convex shapes and are portions of the workpiece that are not cut when the rotary tool is rotated and fed, and the calculation are designed so that the cusps define the dimples in plan view as connected polygons having edges of straight lines, and the calculations are based on a configuration that each dimple is formed during one rotation of the cutting blade.

2. The workpiece machined surface display method according to claim 1, wherein the dimple image forms a spherical shape or ellipsoidal shape.

3. The workpiece machined surface display method according to claim 2, wherein the first step includes predicting the position of the dimple, assuming that a plurality of dimples to be formed on the workpiece machined surface are the same in shape as each other.

4. The workpiece machined surface display method according claim 1, wherein the first step includes predicting the shape and position of the dimple by subtracting a movement locus model generated in accordance with a movement locus of the cutting blade from a workpiece shape model representing a workpiece shape before machining.

5. The workpiece machined surface display method according to claim 1, wherein the first step includes predicting the shape and position of the dimple in accordance with a tool path along the workpiece machined surface.

6. A workpiece machined surface display device displaying a machining mark to be formed when machining a workpiece machined surface with a rotary tool having a cutting blade, comprising:
 a display device;
 a dimple specifying part specifying shapes and positions of dimples to be formed by cutting the workpiece machined surface with the cutting blade when the rotary tool is rotated and fed, by reading shape data of the workpiece and shape data of the tool and calculating a workpiece shape model after machining; and
 a display control part controlling the display device so as to display dimple images representing the shapes of the dimples specified by the dimple specifying part at the positions specified by the dimple specifying part,
 wherein when the dimple specifying part specifies the shapes and positions of dimples, calculations are performed to identify cusps that have convex shapes and are portions of the workpiece that are not cut when the rotary tool is rotated and fed, and the calculation are designed so that the cusps define the dimples in plan view as connected polygons having edges of straight lines, and the calculations are based on a configuration that each dimple is formed during one rotation of the cutting blade.

7. A tool path generating system generating a tool path for machining a workpiece surface with a rotary tool having a cutting blade, comprising:
 a display device;
 a dimple specifying part specifying shapes and positions of dimples to be formed by cutting the workpiece surface with the cutting blade when the rotary tool is rotated and fed, by reading shape data of the workpiece and shape data of the tool and calculating a workpiece shape model after machining;
 a display control part controlling the display device so as to display dimple images representing the shapes of the dimples specified by the dimple specifying part at the positions specified by the dimple specifying part; and
 a path generating part generating a tool path of the rotary tool based on the shape and position of the dimple specified by the dimple specifying part,
 wherein when the dimple specifying part specifies the shapes and positions of dimples, calculations are performed to identify cusps that have convex shapes and are portions of the workpiece that are not cut when the rotary tool is rotated and fed, and the calculation are designed so that the cusps define the dimples in plan view as connected polygons having edges of straight lines, and the calculations are based on a configuration that each dimple is formed during one rotation of the cutting blade.

* * * * *